3,038,833
METHOD AND APPARATUS FOR PRODUCING
MULTIPLE PLY FABRIC ARTICLES
Wilfrid Glover, Leyland, England, assignor to BTR Industries Limited, London, England, a British company
Filed Aug. 21, 1958, Ser. No. 756,380
Claims priority, application Great Britain Aug. 29, 1957
7 Claims. (Cl. 156—322)

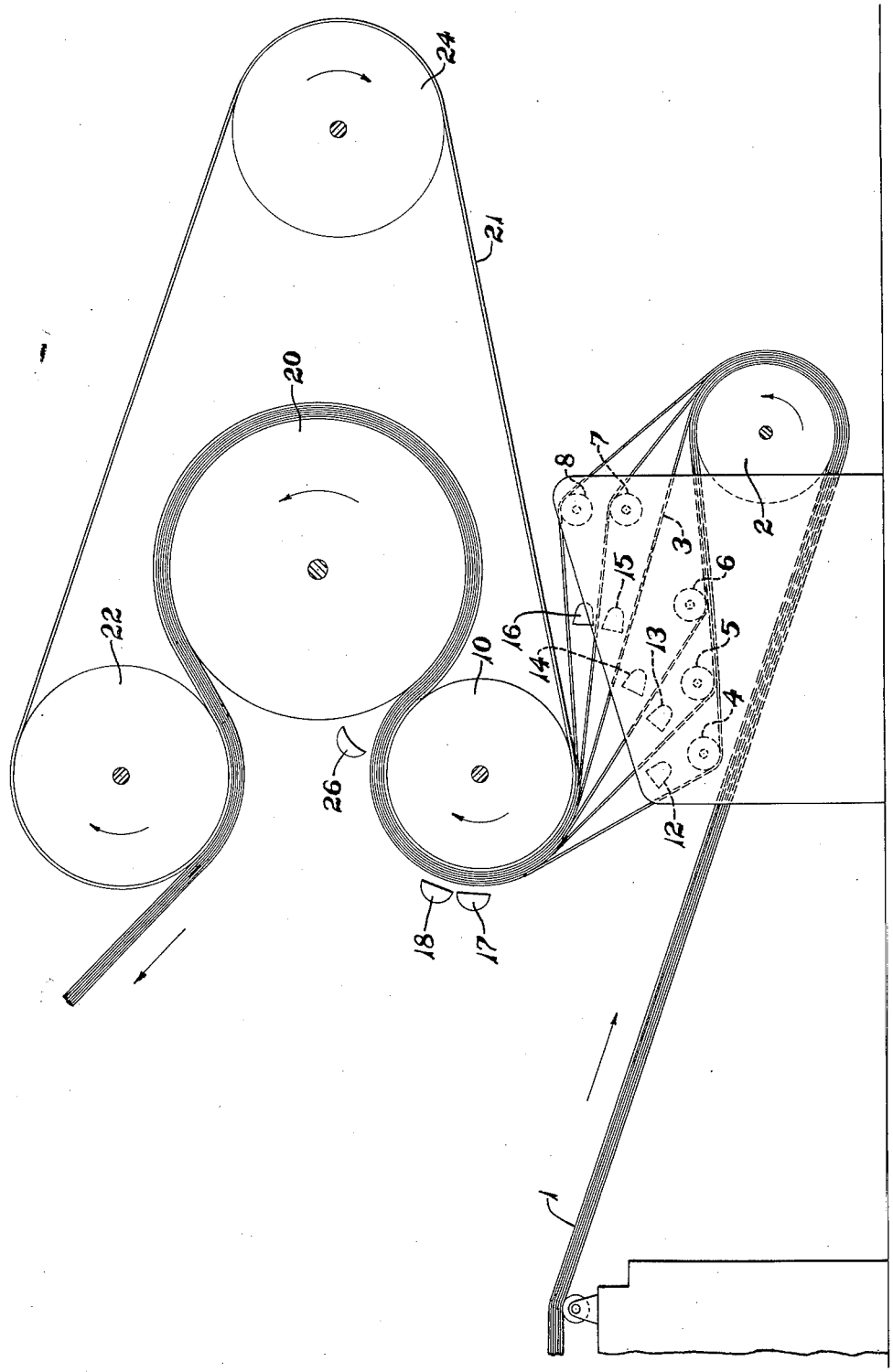

This invention relates to a method and apparatus for producing multiple ply fabric articles and, more particularly, to the production of such articles by the lamination of a plurality of sheets or webs of fabric which are coated, impregnated, or otherwise include a thermoplastic material.

Conveyor belting and other articles of similar construction may be formed by uniting together two or more plies of material. One way in which this may be accomplished is by superposing the desired number of plies of fabric and bonding the plies by a thermoplastic material. The fabric may be supplied in sheet or web form with the thermoplastic material present as a coating on the fabric, an impregnant thereof, or incorporated therein by other known methods. The uniting of the fabric is effected by the application of heat to soften the thermoplastic material preferably accompanied or followed by the application of pressure. Successful production of multiple ply articles in this manner requires adequate heating of all contacting surfaces without excessive elevation of temperature of any portions of the composite material. Moreover, best results are achieved when the temperatures of the several plies are substantially uniform at the time when they are superposed and subjected to the laminating pressure. Achievement of these and related optimum conditions for uniting plies of fabric containing thermoplastic material has proved difficult especially when the plies are supplied in web form and union of the plies has been attempted as a continuous process.

The principal object of the invention is to provide an improved method and apparatus for more adequately and uniformly heating two or more plies of thermoplastic containing fabric prior to their superposition in contacting relationship thereby producing a composite multiple ply article in which the plies are effectively united to each other.

A more specific object of the invention is to effect the heating of the plurality of plies, as defined above, by the application of heat to the adjacent surfaces of the plies in the vicinity of the region where the plies are superposed in laminating relationship.

Another object of the invention is to provide a method and apparatus for producing composite multiple ply articles employing the application of heat to the plies, as defined above, followed by the application of pressure to the superposed plies with the pressure being maintained as the composite article is cooled.

Other objects and advantages of the invention will be apparent from the hereinafter detailed description of a presently preferred embodiment described with reference to the accompanying drawing, forming a part of this specification, in which the single FIGURE somewhat schematically illustrates the steps of the method and an apparatus for performing those steps.

The invention is susceptible of employment in forming articles composed of multiple ply fabric material with the number of plies being two or more and containing a thermoplastic material as a coating or impregnant of the fabric or in other known form. The specific composition of the thermoplastic material is not a part of the invention and any of the substances suitable for bonding the fabric, and which preferably remain flexible after the bonding, may be employed. It is to be understood, therefore, that while the specific embodiment illustrated and hereinafter described in detail discloses only the formation of six-ply conveyor belting united in by polyvinyl chloride, it is to be understood that this in intended only as illustrative and not as a limitation of the invention.

In performing the method of this invention to form six-ply fabric conveyor belting, separate plies of fabric in web form are dipped or coated with polyvinyl chloride plastic of suitable composition and may then be dried, if desired, by conventional means not shown. The separate plies are then preferably assembled in superposed non-adhered relationship by known means and are fed as a unit, indicated at 1, to a suitable guide roll or drum 2. After passing over the guide roll 2, the individual plies are separated and, with the exception of an intermediate ply 3, are diverted in spaced individual paths by small guide rollers 4, 5, 6, 7 and 8. The undeflected ply 3 and the deflected plies, after passage over the guide rollers 4 to 8, travel to an assembly roller or drum 10 in converging paths extending tangentially relative to the drum on which the plies are reassembled in superposed contacting relationship.

During the travel of the plies in converging relationship to their region of assembly on the roller or drum 10, the adjacent surfaces of the plies, which are to be in contact, are heated adjacent the region of their contact. Preferably, the heating means, indicated at 12, 13, 14, 15 and 16 in the drawing, are located as close as practical to the region of reassembly of the plies on the drum 10 and hence are located between the latter and the guide rollers 4, 5, 6, 7 and 8. Moreover, the heating means 12 to 16 are preferably of the radiant type and constructed so that the heat therefrom is directed upon the adjacent surfaces of the fabric plies and toward the region where these plies first contact each other upon the drum 10. One form of suitable heating means comprises internally heated bars of the type sold by the British Thomson-Houston Co., Ltd. under the trade name "Pyrobar." The heating means 12 to 16 produce a surface temperature of the plies within the range of 350–400° F. The drum 10 is also preferably maintained at a temperature of about 350° F. and disposed around the portion of the drum over which the plies travel are additional heating elements 17 and 18, similar to those designated 12 to 16, which provide a temperature on the assembled plies of about 350° F.

The assembled and heated plies pass around approximately 180° of the assembly drum 10 and are then transferred to a larger diameter cooling drum 20 around which they are carried for approximately 270° of the peripheral extent of the latter. The temperature of the cooling drum 20 may be maintained by any suitable means, not shown, at a temperature in the range of 60–100° F. The transfer of the assembled plies from drum 10 to drum 20 is effected by an endless flexible steel band 21 which passes around the assembly drum 10 radially inwardly of the plies and around the cooling drum 20 radially outwardly of the plies. The flexible band 21 has a width at least equal to that of the plies and is maintained under substantial tension and in a manner such that it applies appreciable pressure, for example, in the range of 60–75 pounds per square inch, upon the assembled plies as they pass around the cooling drum. The band 21 is directed about the drum 20 to maintain the band in contact with the drum as aforementioned by means of a drum or roller 22, tension being applied by a drum or roller 24 as will be readily understood. Suitable driving means is provided for one of the rollers or drums 22 or 24 by conventional means not shown.

The plies are, therefore, consolidated and cooled as they pass around the drum 20 and leave the drum as an integral, bonded unit ready for further operations thereon if these be desired. For example, while the assembled and bonded plies may be employed as they issue from the drum 20 in the form of conveyor belting or for other purposes, it may be desirable to provide the plies with top and bottom cover layers of thermoplastic material and/or perform other operations thereon or additions of material thereto dependent upon the use to which the laminated material is to be put.

Preferably, the assembled and heated plies are subjected to an initial consolidating pressure as they leave the assembly drum 10 and pass to the cooling drum 20. This is effected by disposing the drums 10 and 20 adjacent each other so that pressure is exerted upon the material as it passes through the nip between the drums. If desired, one or more heating units 26, similar to the heating means 12 to 16, may be provided, as shown in the drawing, immediately at the vicinity of the nip between the drums 10 and 20 to maintain the temperature at this location, this radiant heating unit being so positioned that the heat therefrom is directed into the nip.

Although the invention has been described with specific reference to the steps of procedure and apparatus employed for forming conveyor belting from six-ply fabric containing polyvinyl chloride thermoplastic material, it will be understood, as hereinbefore mentioned, that the invention is not limited to this exact number of plies nor to the use of polyvinyl chloride as the thermoplastic material. Moreover, the steps of procedure may be performed by apparatus other than that herein illustrated. For example, the plies may be brought together for the first time upon the assembly drum 10 or the plies may be brought together at the nip between the drum 10 and the cooling drum 20. It will also be apparent that heating means other than the specific radiant heaters mentioned may be employed and that other changes, which will occur to those skilled in the art, may be made. Therefore, the invention is not to be considered as limited to the specific details herein shown and described except as may be required by the spirit and scope of the appended claims.

Having thus described the invention, I claim:

1. The method of making an article of the type comprising a plurality of superposed plies of fabric bonded with a thermoplastic material which method comprises the steps of disposing a plurality of separate webs of fabric including a thermoplastic material in superposed face-to-face contacting relationship, passing the webs in contacting relationship over a guiding surface, separating the webs after they pass over said guiding surface, directing the separated webs along converging paths to again bring them into face-to-face contact, radiantly heating the adjacent faces of the webs immediately at the region where the webs come together sufficiently to soften the said thermoplastic material, contacting the heated webs in superposed relationship immediately after the heating, subjecting the heated superposed webs to pressure, and cooling the superposed webs to a temperature below the fusion temperature of the thermoplastic material while maintaining pressure on the webs.

2. An apparatus for producing a composite article from a plurality of separate fabric webs containing a thermoplastic material, the said apparatus comprising a guide drum, means to direct the plurality of webs to be united to said drum in superposed relationship, an assembly drum spaced from said guide drum, means between said drums to separate the plurality of webs from each other and to permit the separated webs to converge to superposed contacting relationship on the said assembly drum, heating means adjacent said assembly drum and disposed between said webs in positions to heat the adjacent surfaces of the webs as they converge to said assembly drum, and means to apply continuing pressure to the superposed webs as they leave said assembly drum.

3. An apparatus as defined in claim 2 wherein the said heating means are of the radiant type and are so arranged that the heat therefrom is directed toward the region of contact of the adjacent converging webs.

4. An apparatus as defined in claim 2 and further comprising additional heating means adjacent said assembly drum for heating the outer surface of superposed webs thereon.

5. An apparatus for producing a composite article from a plurality of separate fabric webs containing a thermoplastic material, the said apparatus comprising a guide drum, means to direct the plurality of webs to be united to said drum in superposed relationship, an assembly drum spaced from said guide drum, means between said drums to separate the plurality of webs from each other and to permit the separated webs to converge to superposed contacting relationship on said assembly drum, heating means adjacent said assembly drum and disposed between said webs in positions to heat the adjacent surfaces of the webs as they converge to said assembly drum, and means including a cooling drum and a metallic belt passing about a major portion of said cooling drum and cooperating with the assembly drum to apply pressure on and cool said superposed webs under pressure as they leave said assembly drum.

6. An apparatus for producing a composite article from a plurality of separate fabric webs containing a thermoplastic material, the said apparatus comprising a guide drum, means to direct the plurality of webs to be united to said drum in superposed relationship, an assembly drum spaced from said guide drum, means between said drums to separate the plurality of webs from each other and to permit the separated webs to converge to superposed contacting relationship on said assembly drum, radiant heating means adjacent said assembly drum and disposed between said webs to direct heat upon the adjacent surfaces of the webs as they converge to said assembly drum, a cooling drum, and a pressure-applying band extending around said cooling and assembly drums in a manner such that the superposed plies are delivered from the assembly drum to the cooling drum in pressure contact with the latter.

7. An apparatus as defined in claim 6 wherein the said pressure-applying band passes around said assembly drum radially inwardly of the superposed webs and around the cooling drum radially outwardly of the said webs, and guide means for said band to maintain the latter in pressure-exerting contact with the webs on the cooling drum for a majority portion of the circumference of the latter.

References Cited in the file of this patent

UNITED STATES PATENTS

| | | |
|---|---|---|
| 1,787,404 | Taylor et al. | Dec. 30, 1930 |
| 2,433,965 | Upson | Jan. 6, 1948 |
| 2,434,541 | Bierer | Jan. 13, 1948 |
| 2,722,735 | Beamish | Nov. 8, 1955 |
| 2,788,838 | Crabbe et al. | Apr. 16, 1957 |

FOREIGN PATENTS

| | | |
|---|---|---|
| 1,115,070 | France | Dec. 26, 1955 |
| 122,807 | Australia | Nov. 14, 1946 |